Sept. 3, 1968   C. A. LEE ET AL   3,399,587
SHEET HANDLING METHOD AND APPARATUS
Filed Oct. 26, 1965   7 Sheets-Sheet 6

United States Patent Office 3,399,587
Patented Sept. 3, 1968

3,399,587
SHEET HANDLING METHOD AND APPARATUS
Charles Allen Lee, Knoxville, Tenn., and Thomas S. Bartley, Toronto, Ontario, Canada, assignors, by direct and mesne assignments, to Canadian International Paper Company, Montreal, Quebec, Canada, a body corporate and politic
Filed Oct. 26, 1965, Ser. No. 505,259
14 Claims. (Cl. 83—99)

ABSTRACT OF THE DISCLOSURE

Sheets are transferred from a first moving carrier to a second moving carrier by an apparatus practicing the method of substantially simultaneously causing a positive air pressure to eject the sheet from the first carrier and a suction force at the second carrier to draw the sheet to the second carrier. The sheets may also be held on the first carrier by suction prior to ejection by the positive air pressure.

---

The present invention relates to material handling methods and apparatus and, more particularly, is directed to a method and apparatus for continuously depositing a sheet of light, flexible material on a continuously moving receiver.

In a co-pending patent application Ser. No. 494,573, filed Oct. 11, 1965, entitled, "Disposable Diaper," a diaper construction is disclosed which includes a reinforcing strip of creped tissue disposed at each end of the diaper pad. These strips have a greater strength in a direction transverse to the length of the diaper than in a direction parallel to the length and serve as belts or belly bands which encircle the diaper wearer's waist, increasing both the comfort and the strength of the diaper.

In the manufacture of this diaper, the strips are preferably deposited upon a continuously moving web with their centers spaced from one another a distance equal to the desired length of the diaper being formed and with their line of strength arranged transversely of the direction of movement of the web. The web, with the strips deposited thereon, is subsequently caused to envelop an absorbent pad, and the enclosed pad is then severed transversely centrally of the strips to form the completed diapers. Each diaper thus has one-half of one of the strips at each of its ends.

There is hereinafter described a method and apparatus capable of depositing the above referred-to creped strips on a continuously moving web in an economical and satisfactory manner. However, while this method and apparatus will be described with reference to this specific application, it should be understood that the invention is not limited to such application, which is presented by way of example only.

The principal object of the present invention is to provide an improved material handling method and apparatus.

Another object of the invention is the provision of an improved method and apparatus for depositing sheet material on a continuously moving receiver.

A further object of the invention is to provide an improved method and apparatus for depositing a plurality of sheets of material at predetermined spaced intervals on a continuously moving receiver.

A still further object of the invention is to provide an improved method and apparatus for depositing a sheet of tissue paper on a continuously moving web with the line of strength of the tissue arranged transversely of the direction of movement of the web.

A more specific object of the invention is to provide an improved method and apparatus for depositing strips of light tissue paper on a continuously moving tissue web at predetermined space intervals from one another.

A related object of the invention is to provide such an improved method and apparatus in which the foregoing can be accomplished rapidly and in an efficient and economical manner.

Other objects and advantages of the invention will become apparent with reference to the following description and the accompanying drawings.

In accordance with the method of the invention, as performed by an apparatus 20 shown in the drawings and constituting one suggested embodiment thereof, which apparatus will be described in detail shortly, a web 22 is continuously moved along a given path and in a generally horizontal plane and has a suction created at its upper surface. A web 24 of light flexible sheet material such as creped tissue, having a strength greater in one direction than in the direction transverse thereto, is continuously fed into the apparatus 20 in a direction transverse to the path of movement of the web 22 and in a plane parallel to the plane of the web 22. The line of strength of the web 24 is arranged parallel to the direction of its travel. Strips 26 are severed from the web 24 and are moved by an air pervious carrier screen 28 in a path parallel to their line of strength but transverse to the path of the web 22 and in a plane above the plane of the web 22. The strips 26 are maintained in contact with the carrier 28 by suction. When a strip 26 is in approximate vertical alignment with that portion of the web 22 on which it is to be deposited, this suction is released. Simultaneously, a positive air pressure is created which expels the strip from the carrier in the direction of the web 22. The combined effect of the release of the suction maintaining the strip 26 in contact with the carrier 28, the creation of the positive air pressure expelling the strip from the carrier, and the suction at the surface of the web 22, causes the strips to be successively rapidly transferred to predetermined locations on the web 22 in the desired orientation, i.e., with their lines of strength arranged transversely of the direction of movement of the web 22, without disturbing the web.

The apparatus 20 of the drawings, which is adapted to carry out the above method and which constitutes one embodiment of the invention, comprises a frame 30 on which are mounted rolls 32 and 34 which guide and support the web 22 for movement through the apparatus in a generally horizontal plane. An endless air pervious lower carrier screen or receiver 36 is also mounted on the frame 30 and has a horizontally disposed upper run 38 which is positioned immediately beneath the plane in which the web 22 travels. A vacuum or suction box 40 is positioned beneath the upper run 38 of the carrier 36 and creates a constant suction at the upper surface of the upper run of the carrier and, acting through the web 22, at the upper surface of the web 22.

The webs 24 (two such webs are delivered simultaneously to the apparatus) are received by feed mechanisms 42 and delivered to cutters 44 which cut predetermined lengths therefrom as strips 26. As the strips are formed, they are caused to adhere to the lower surfaces of lower generally horizontal runs 46 of the endless air pervious carrier screens 28 by a suction pressure created at the lower surface by vacuum or suction boxes 47 located adjacent the upper surface of the lower runs 46 and extending from one end to approximately the centers thereof. The lower runs 46 of the carrier belts or screens 28 move transversely of the upper run 38 of the carrier 36 which supports the web 22 and pass in close proximity thereto. Also positioned above the lower runs 46 of the upper carriers 28 and extending from approximately the centers thereof to the opposite ends so as to be in vertical alignment with the web 22 are valid boxes 48, each of which is alternately maintained under a suction pressure to maintain strips 26 in contact with the respective carrier 28 until they are moved into overlying relation to the web 22, and a positive pressure to expel the strips in the direction of the web 22. A timing mechanism 50 is provided to synchronize the operation of each valved box with that of the cutters and speed of travel of the carrier 28.

Referring now to the structure of the apparatus in greater detail, the frame 30 comprises (FIG. 1) three sets of legs or posts, namely, a first set 52 located adjacent the right end of the apparatus as viewed in FIGURE 1, hereinafter referred to as the rearward end, a second set 54 located adjacent the opposite or forward end, and a third set 56 located intermediate the sets 52 and 54. The legs of the first set 52 are more closely spaced relative to each other than the legs of the other two sets, and it is at this end of the apparatus that the webs 24 enter for movement forwardly through the apparatus. Beams 58, 60 and 62 span each of the sets of legs 52, 54 and 56 respectively at their upper ends. The intermediate legs support, in addition, a second beam 64.

Supported by the rearward and intermediate sets of legs adjacent the ends of the beams supported thereby are a pair of vertically disposed horizontally spaced side plates 66 on which are mounted components of the feed mechanisms 42 of the webs 24. Each of the legs of the intermediate and forward set support, in addition, an upstanding generally vertically disposed pillar 68, with the pillars of each set of legs being interconnected by a cross beam 69 adjacent their upper ends. The pillars of each side of the apparatus are interconnected at their lower ends and adjacent their upper ends by plates 69a which extend horizontally in the direction of movement of the webs 24.

Figures 6, 7:
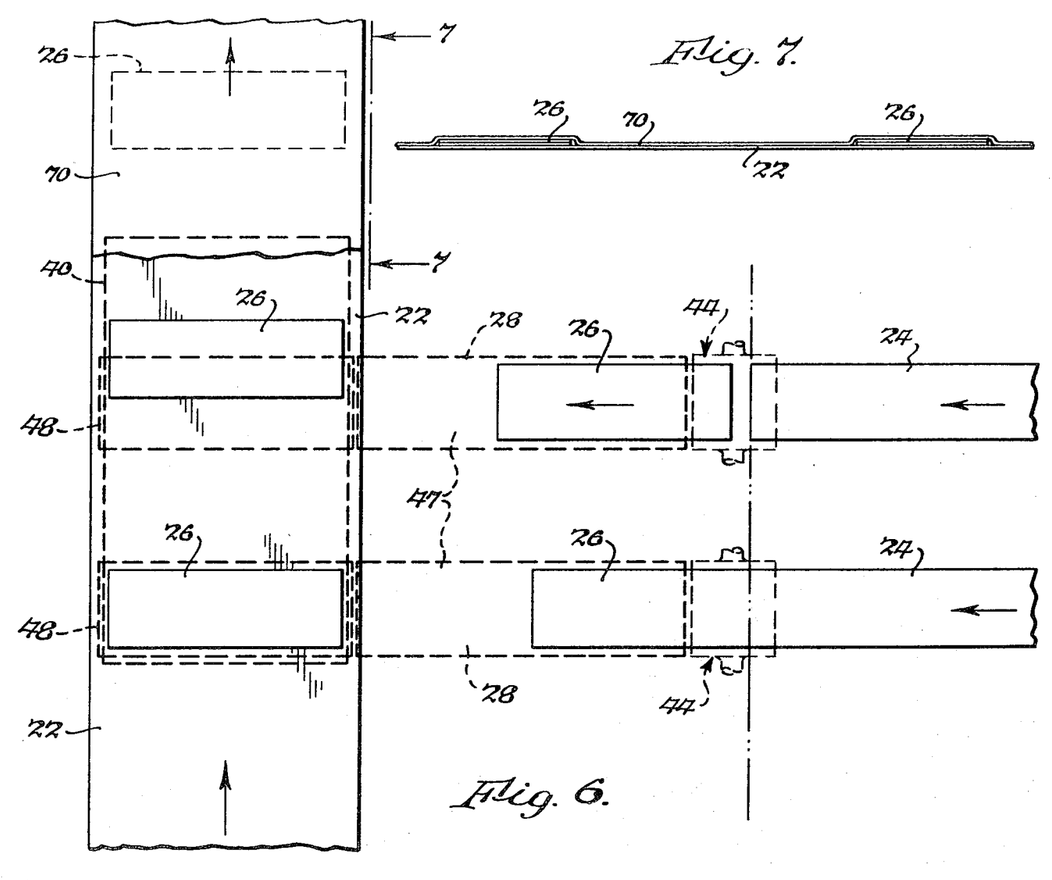
FIGURE 6 is a fragmentary diagrammatic top view of the apparatus of FIGURE 1.
FIGURE 7 is a view taken in the direction of the arrows 7—7 of FIGURE 6.

The web 22 upon which the strips 24 are ultimately deposited is, in one preferred embodiment, a single ply creped tissue. It enters the apparatus at one side, hereinafter referred to as the entry side, and is moved toward the opposite side, hereinafter referred to as the exit or discharge side. A web 70, referred to in greater detail shortly, also enters the apparatus at the entry side, above the web 22, and is placed in overlying relation to the web 22 as the latter leaves the apparatus, thereby sandwiching the strips 24 between the webs (FIG. 7) and maintaining them in position for subsequent delivery to other portions of the diaper-forming equipment.

Figure 3:
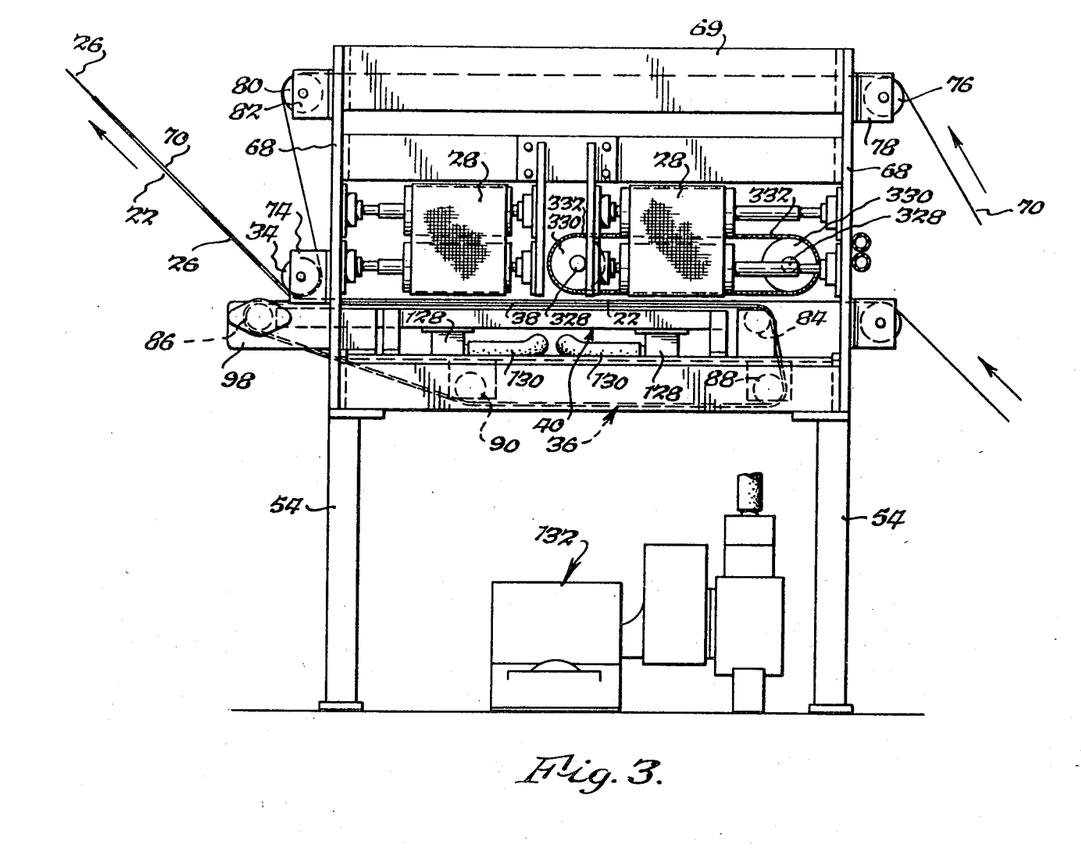
FIGURE 3 is a fragmentary and elevational view of the apparatus of FIGURE 1 as viewed from the left side of the apparatus as seen in that figure.
Figure 4:
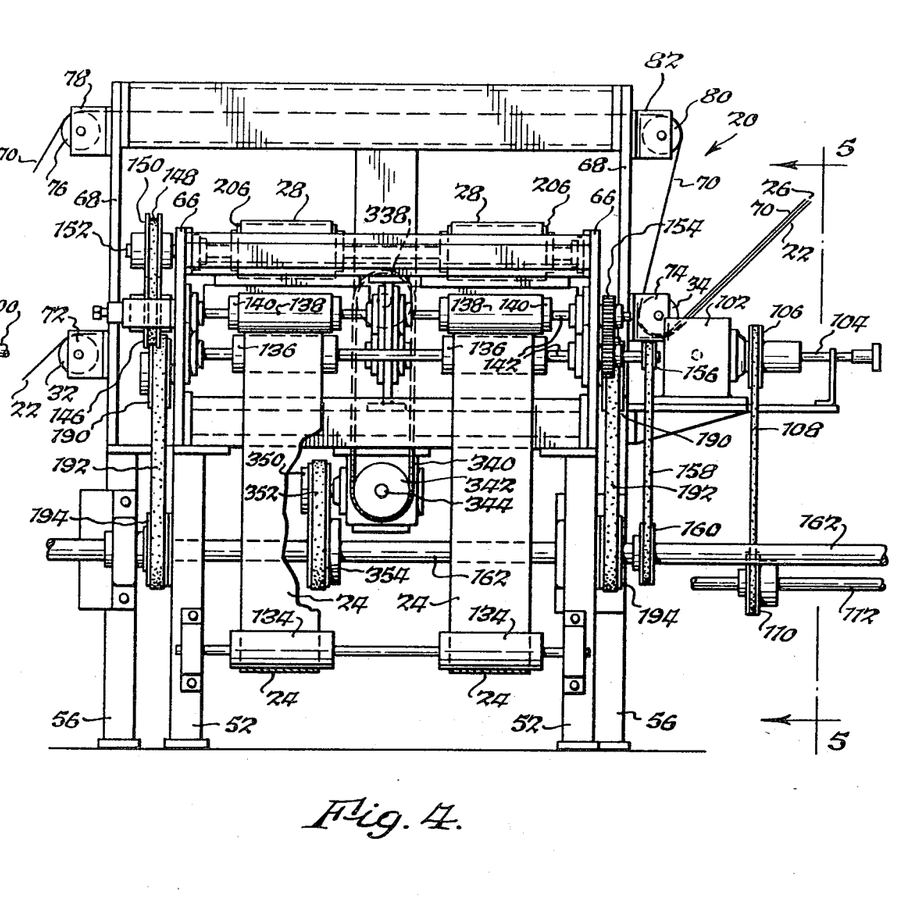
FIGURE 4 is a fragmentary, partially broken-away end elevational view of the apparatus of FIGURE 1 as viewed from the right side of the apparatus as seen in that figure.

With particular reference to FIGURES 3 and 4, the web 22 is drawn through the apparatus 20 from an essentially endless supply source such as a web in coiled form (not shown), and passes upwardly and over the roll 32, previously referred to, which is an elongated horizontally-disposed idler roll supported by means of brackets 72 secured adjacent the lower end of the upright pillars 68 at the entry side of the apparatus. The web passes through the apparatus in a generally horizontal plane and then upwardly beneath the roll 34 which is in the form of a second idler roll supported by means of brackets 74 mounted on the pillars 68 at the opposite or exit side of the apparatus. The web 70, which will not be referred to further, is drawn from a suitable supply source and passes upwardly and over an upper idler roll 76 mounted by means of brackets 78 to the pillar 68 at the entry side of the apparatus above the idler roll 32. This web extends horizontally above both the carriers 28 and 36 to a second idler roll 80 mounted by means of brackets 82 on the pillars 68 above the idler roll 34. The web 70 passes downwardly around and beneath the lower idler roll 34 to place it in intimate overlying contact with the web 22 which also passes around the roll 34.

As has already been noted, the web passes through the apparatus 20 in a generally horizontal plane. Positioned immediately beneath this plane so as to support the web is the upper run 38 of the endless loop-shaped carrier 36 formed of an air pervious material such as, for example, a close mesh screen. The carrier 36 is supported for traveling movement by an upper pair of generally horizontally spaced entry and exit rolls 84 and 86 respectively and by a lower pair of similarly spaced rolls 88 and 90. The rolls 84, 88 and 90 are rotatably mounted in brackets 92 supported by frame members 94 extending longitudinally of the apparatus, i.e., from front to rear (FIG. 1). The roll 86 is keyed to a shaft 96 journalled in brackets 98 extending from the front end of the apparatus and projects through the bracket on one side for coupling engagement to a second shaft 100 connected through a gear reduction 102 to a third shaft 104 (FIG. 2). The latter shaft carries a pulley 106 which is connected by means of a belt 108 to a second pulley 110 affixed to a web line drive shaft 112. Rotation of the web line drive shaft 112 thus causes traveling movement of the carrier 36, this movement being determinative of the speed at which the web 22 travels through the apparatus.

Suitably supported by the frame 30 beneath the upper run 38 of the carrier 36 and effective to cause a suction force at the upper surface of the web 22 is the vacuum or suction box 40. This box, seen best in FIGURES 8 and 9, extends substantially the entire length of the upper run of the carrier 36 and has a width approximating that of the carrier. Very generally, it includes a top plate 114, side and end walls 116 and 118 respectively, and a bottom plate 120 which together define a vacuum chamber 122. The top plate 114 is provided with a plurality of inlet vents or holes 124 through which air passes into the chamber through the web 22 and carrier 36. The bottom plate 120 is provided with a pair of horizontally spaced elongated exhaust openings 126, each of which is connected to a duct 128 depending from the bottom plate and connected by means of a conduit 130 to a suction source such as a vacuum pump 132 located beneath the carrier 36 intermediate the legs of the frame 30 (FIG. 3).

The web 24 from which the strips 26 are formed in one preferred embodiment is a four-ply creped tissue having a strength in one direction greater than its strength in a direction transverse to the one direction, and is fed into the apparatus 20 with its line of strength extending parallel to its direction of travel. The strips 26 are cut from the leading end portion of the web and are transferred to the web 22 by means of the carrier 28. To permit strips to be deposited on the web 22 at a high rate, two separate webs 24 are fed into the apparatus. Accordingly, duplicate carriers 28, feed mechanisms 42, and cutters 44 are provided. Since these structures are essentially identical to each other, however, only one of each will be described, it being understood that the other is of like construction. It is also to be understood that although duplicate mechanisms are provided in the illustrated apparatus, this structure is merely preferred and the method and apparatus of the invention is in no way limited to such arrangement. The same result is achieved by operating one mechanism at a higher rate.

Figure 1:
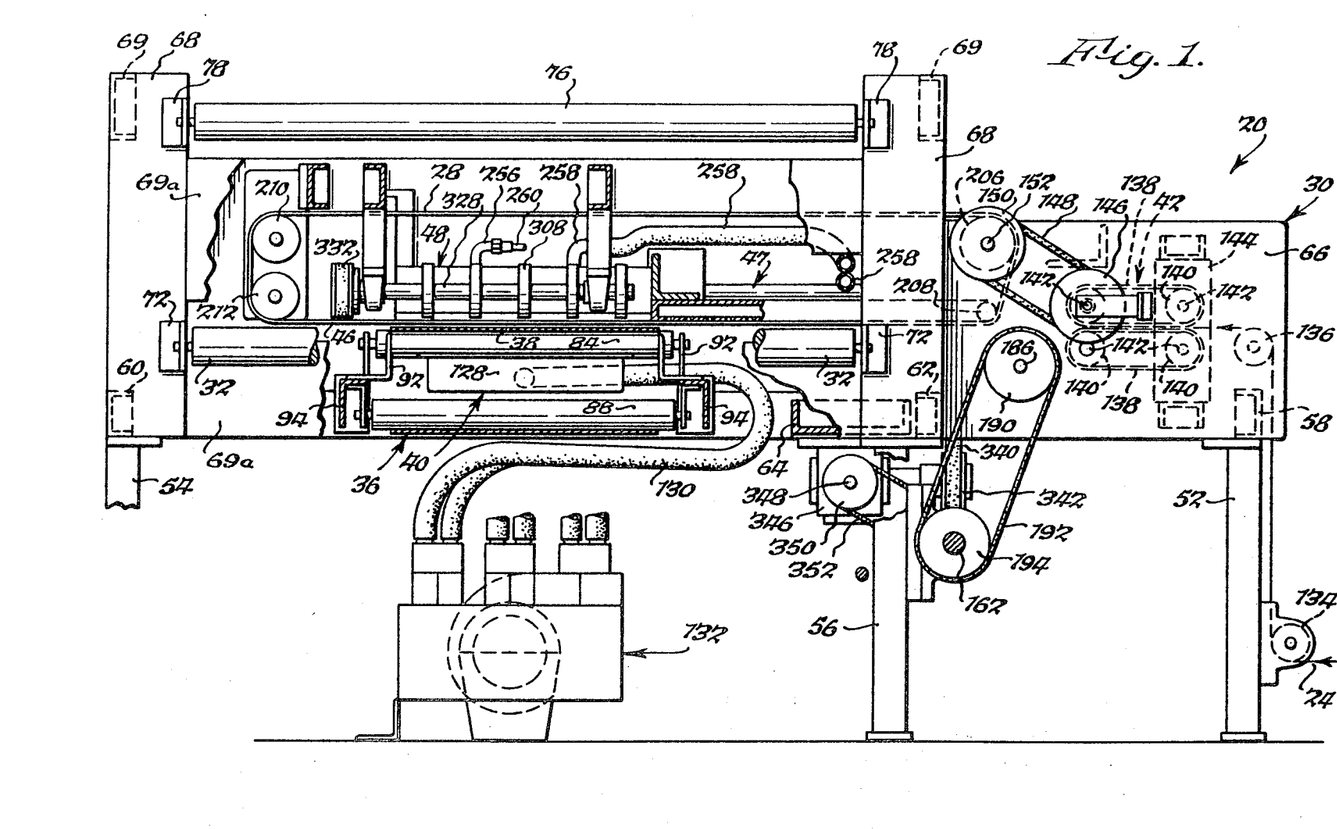
FIGURE 1 is a partially broken-away side-elevational view of an apparatus showing various of the features of the invention.
Figure 2:
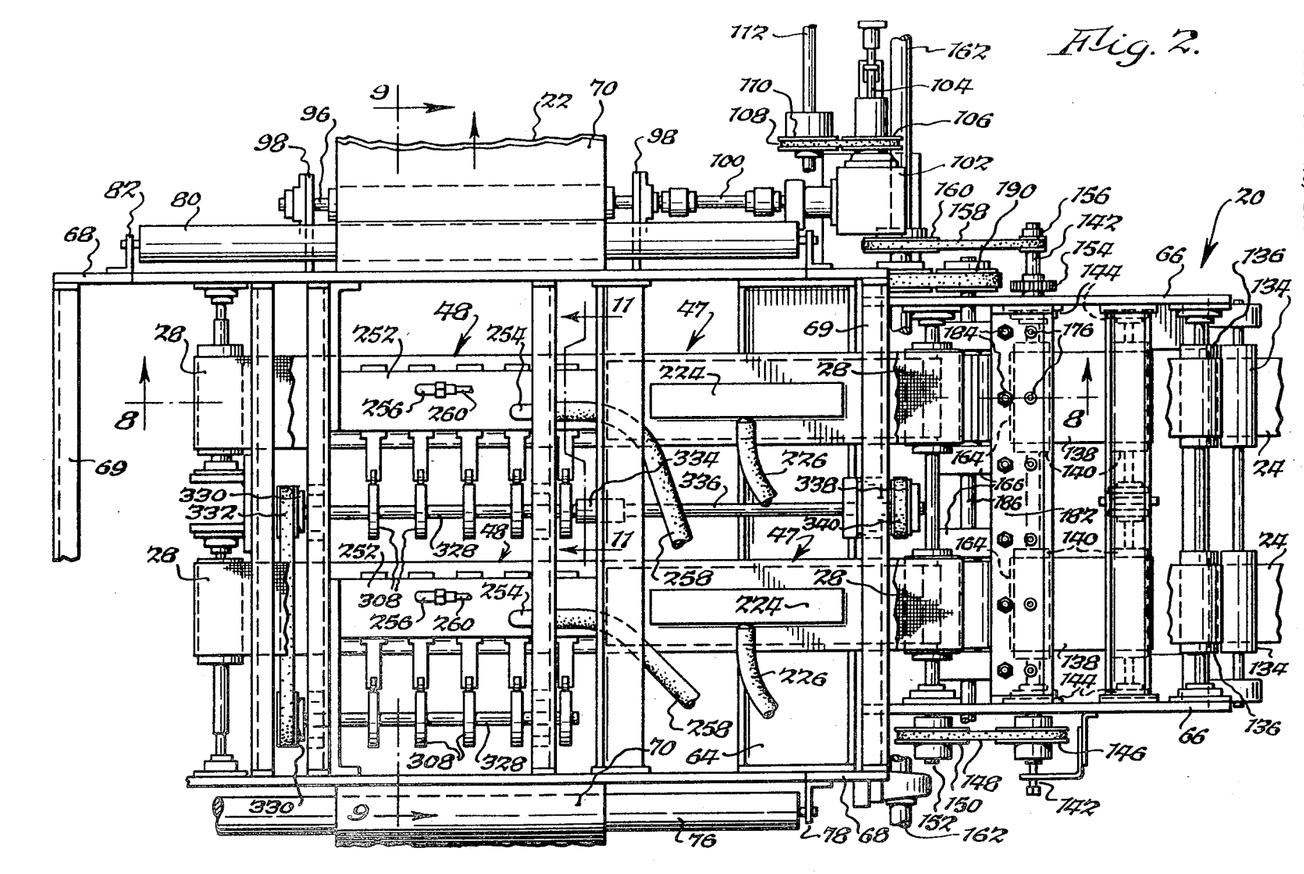
FIGURE 2 is a fragmentary, partially broken-away top plan view of the apparatus of FIGURE 1.

Referring now more particularly to FIGURES 1 and 4, each web 24 is preferably fed into the apparatus 20 from a suitable source (not shown) such as a large supply of the web in coil form. The web passes under an idler roll 134 rotatably mounted on rearward faces of the legs 52 at the rearward end of the apparatus, upwardly to and over a second idler roll 136 rotatably mounted above and slightly forwardly of the roll 134 and then forwardly into the feed mechanism 42. As previously mentioned, the line of strength of the web 24 extends in the direction of movement thereof.

Figure 5:
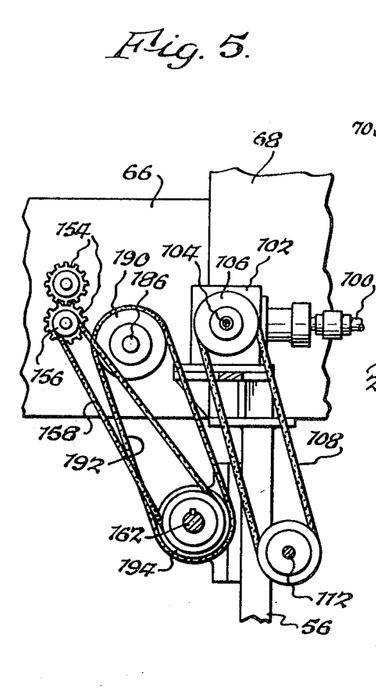
FIGURE 5 is a fragmentary side-elevational view taken along the line 5—5 of FIGURE 4.

Each feed mechanism 42 comprises generally a pair of continuous belts 138, each having a width slightly greater than that of the web 24 and arranged around horizontally spaced rollers 140 to define an oval configuration having vertically spaced upper and lower runs. The belts are positioned relative to each other so that the lower generally horizontal run of the upper belt is essentially contiguous to and in contact with the upper generally horizontal run of the lower belt. The rollers 140 are keyed to shafts 142 rotatably journalled in bearings 144 secured to the vertical side plates 66 at the rearward end of the apparatus. The left end of the shaft of the uppermost forward roller, as viewed in FIGURE 4, extends through the plate 66 and has affixed to it a pulley 146 which is connected by means of a belt 148 to a pulley 150 keyed to a shaft 152 of the carrier 28, as hereinafter described. The right ends of both shafts 142 of the forwardmost roller of each pair extend through the plate 66 at the opposite side of the apparatus (the right side as viewed in FIGURE 4) and each has affixed thereto a gear 154 which is in meshing engagement with the gear of the opposite shaft. In addition, the lower shaft has mounted on it a pulley 156 connected by means of a belt 158 to a pulley 160 mounted on a timing line drive shaft 162 (FIG. 5), which is coupled to the web line drive shaft 112 by suitable means (not shown) so that the two shafts rotate in timed relation to each other. Thus, rotation of the timing line drive shaft is effective to cause rotation of the shafts 142 and, hence, traveling movement of the belts 138 of the feed mechanism 42.

Each web is moved forwardly of the apparatus by the belt feed mechanism 42 and as its forward end portion exits from the forward nip of the belts, it is delivered past one of a pair of the cutters 44 and engaged by and adhered to one of the carriers 28. After a given amount of the web 24 has been advanced by the feed mechanism and extends between the carrier 28 and feed mechanism, it is severed from the remainder of the web to form one of the strips 26.

Figure 8:
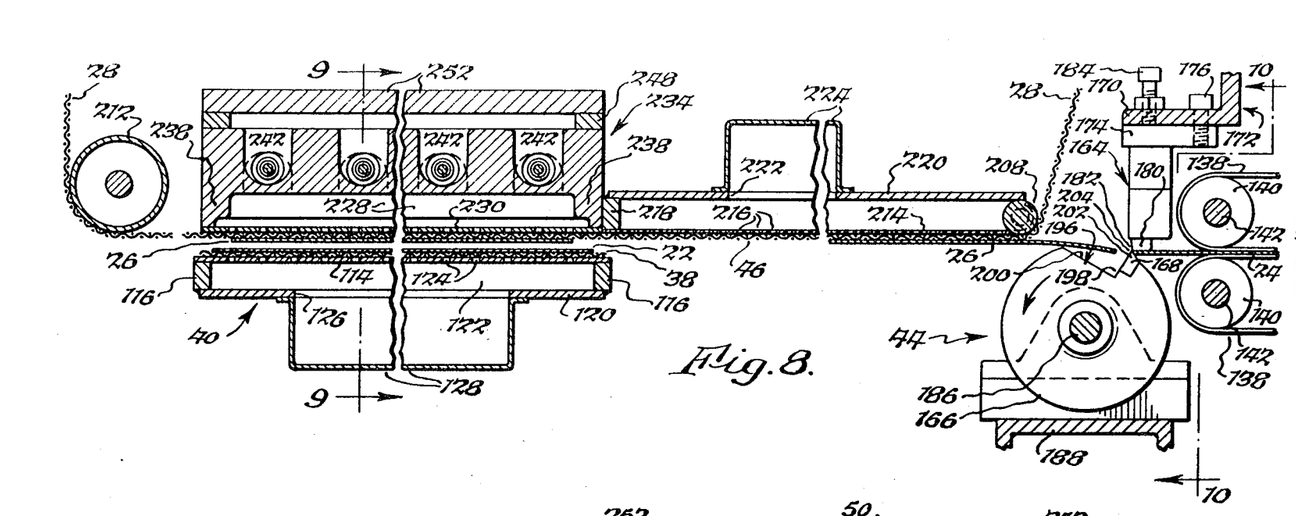
FIGURE 8 is an enlarged fragmentary sectional elevational view taken along the line 8—8 of FIGURE 2.
Figure 9:
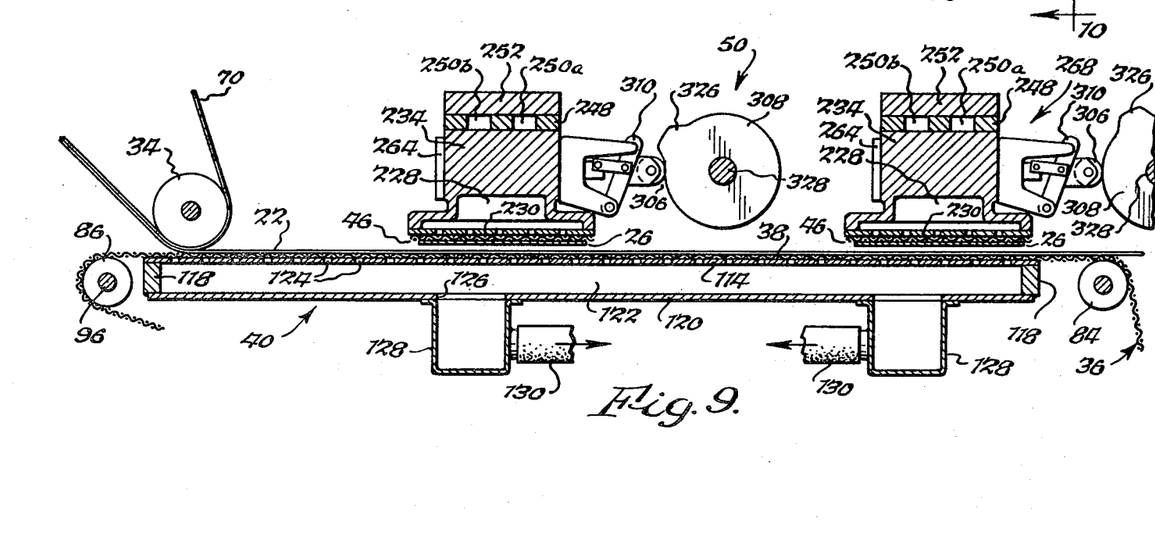
FIGURE 9 is a fragmentary sectional elevational view taken along 9—9 of FIGURE 8.
Figures 10, 11:
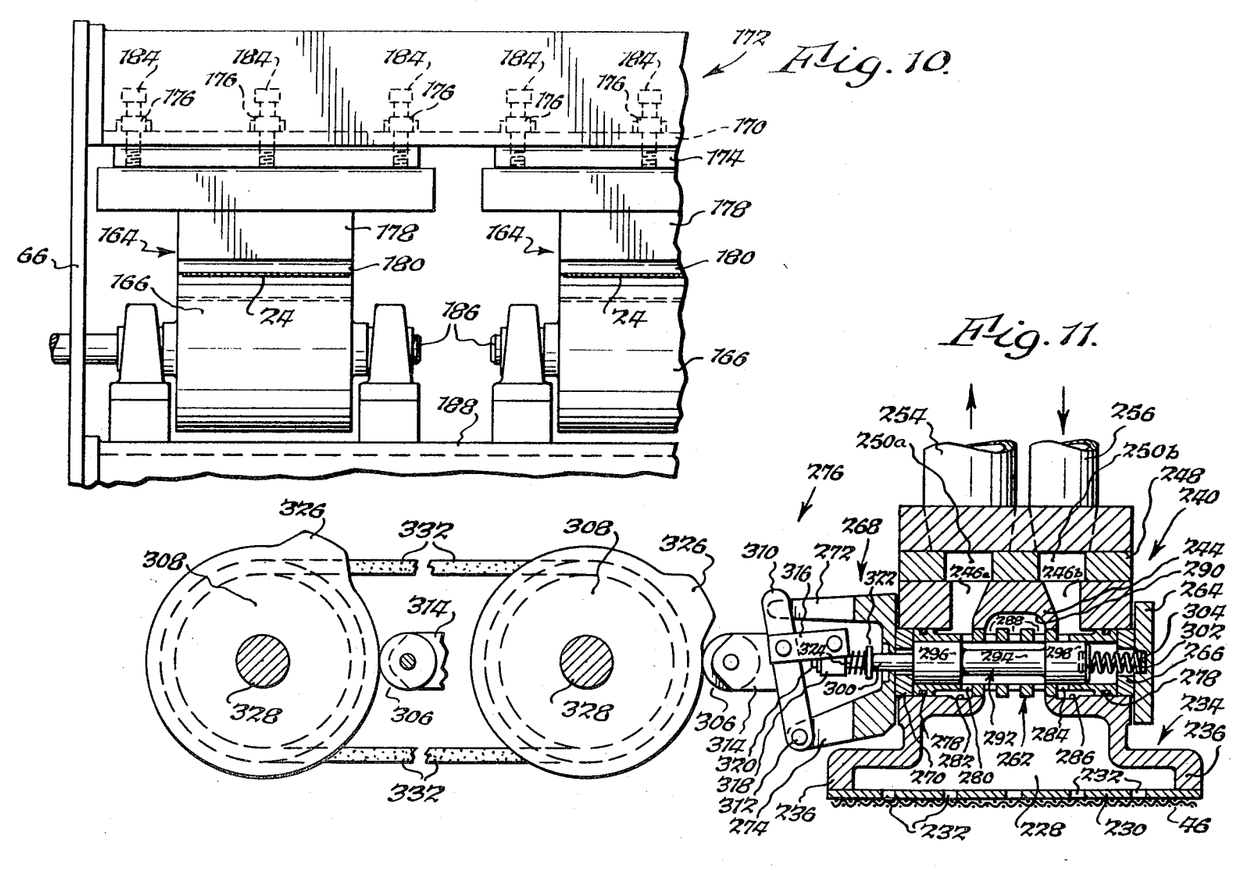
FIGURE 10 is a fragmentary sectional elevational view taken along line 10—10 of FIGURE 8.
FIGURE 11 is a sectional elevational view taken along line 11—11 of FIGURE 2.

Very generally, each cutter 44 as seen best in FIGURES 8 and 10, comprises an anvil 164 and a rotary fly-knife 166 which includes a blade 168 which co-acts with the anvil to sever the web 24. More specifically, each anvil 164 is connected to and supported by a horizontally disposed flange 170 of an angle beam 172 which extends between the vertical side plates 66 at the rearward end of the apparatus intermediate the forward end of the feed mechanism 42 and the rearward end of the carrier 28. Each anvil includes a base plate 174 secured to the flange 170 by bolts 176. A block 178 depends from the plate 174 and has a bar 180 affixed to its lower end. The forwardly facing lower edge 182 of the bar co-operates with the blade 168 of the fly-knife to effect the cutting of the web.

The edge 182 of the bar 180 of the anvil is vertically adjustable so as to permit it to be moved toward and away from the fly-knife 166 as, for example, to initially provide the desired setting and, later, to compensate for wear of the knife-blade 168. In the illustrated embodiment, this adjustment is accomplished by the provision of threaded holes extending through the flange 170 of the beam 172 to receive bolts 184 which bear against the upper surface of the base plate 174. Thus, when the bolts 176 securing the plate to the flange are loosened and the adjustable bolts are tightened, the anvil 164 will tilt slightly in a counterclockwise direction (FIG. 8) thereby lowering the edge 182 of the bar.

Each of the rotary fly-knives 166 is positioned generally beneath one of the anvils 164 and is keyed to a shaft 186 rotatably mounted in bearing blocks supported on a cross-beam 188 of the frame. Two such shafts are provided, one for each fly-knife and, though the shafts are in alignment, they are individually supported (FIG. 10). Each of the shafts extends through the adjacent side wall plate 66 of the rearward end of the apparatus and has affixed thereto a pulley 190 (FIGS. 1 and 5) which is connected by means of a belt 192 to a similar pulley 194 affixed to the timing line drive shaft 162, previously mentioned, which also drives the feed mechanism and the carrier 28. Thus, while each of the cutters is mounted on a separate shaft, the pair of cutters are driven in common by the timing line drive shaft 162.

Each of the fly-knives 166 comprises (FIG. 8) a solid element which is cylindrical in shape except for the provision of a notch or cutaway portion 196 which extends axially of the cylinder from one face to the other. The notch of each cylinder is defined by a first surface 198 which extends generally radially of the axis a distance less than one-fourth the diameter of the cylinder, and by a second surface 200 which extends generally normal to the first surface from the inner end thereof to the outer surface of the element. The knife blade 168 is inset into the first surface 198 adjacent the outer edge thereof and includes an upwardly projecting portion 202, the upper horizontal edge of which defines a cutting edge 204 which cooperates with the forward edge 182 of the bar of the anvil. Thus, as the cutter rotates, the cutting edge 204 of the blade 168 is periodically brought into cooperating engagement with the edge 182 of the bar 180 of the anvil and severs the web 24 which is supported therebetween.

It will be noted in FIGURE 8 that the web 24 is continuously fed beneath the lower end of the anvil 164 by the feed mechanism 42 as the fly-knife 166 rotates. After the web has been severed, the leading end portion thereof is partially supported from beneath by the cylindrical surface of the fly-knife extending between opposite edges of the notch 196, i.e., by that portion of the outer surface of the element which is uninterrupted by the notch 196. Thus, a relatively long leading end piece of the web 24 can pass from the feed mechanism and be supported beneath the anvil between the successive cuts made by the fly-knife. This uncut leading end piece of web 24 is long enough to extend from the nip of the belts 138 of the feed mechanism to the carrier 28 which is positioned immediately adjacent the forward end of the cutter. Thus, an uncut leading end segment of the web 24 is supported at one end by the carrier and at the other end by the feed mechanism. When the cut is made, the severed segment or strip 26 continues to be supported by the carrier 28 but is no longer supported by the belts 138 of the feed mechanism 42. However, this end of the strip does fall into the notch 196 of the fly-knife and is supported by the knife during the brief interval which elapses before it is entirely supported by and in contact with the carrier 28.

As has previously been pointed out, it is desired to arrange the sheets 26 onto the web 22 with the line of strength of the sheet arranged transversely of the direction of movement of the web. In the illustrated embodiment, the carriers 28 carry the sheets with the line of strength of the sheets arranged parallel to the direction of movement of the carriers and the desired orientation of the sheets is accomplished by arranging the carriers 28 transversely of the webs 22.

Each of the carriers 28 is fabricated of an air-pervious material such as a close mesh screen and is in the form of an endless band or loop slightly greater in width than the width of the strips 26. Each loop-shaped carrier is supported by four rollers (FIG. 1), namely, an upper roller 206 of relatively large diameter rotatably mounted adjacent the rearward portion of the apparatus, a lower roller 208 of somewhat smaller diameter rotatably mounted beneath the large roller 206 and in vertical alignment therewith, and a pair of vertically spaced and aligned rollers 210 and 212 of intermediate diameter located adjacent the forward end of the apparatus. The rollers are so positioned that the lower run 46 of the carrier is positioned in closely spaced relation to the upper run 38 of the carrier 36. This spacing is preferably adjustable in a manner not shown for optimum performance.

The rollers 208, 210 and 212 of each carrier are mounted on shafts which are independent of the shafts of the corresponding rollers of the other carrier (FIG. 2). However, the large rollers 206 of each carrier are mounted on the shaft 152, previously referred to (FIGS. 2 and 4) which extends through one of the side plates 66 of the apparatus (the left side as viewed in FIGURE 4) and has secured to it the pulley 150 which is connected by means of the belt 148 to the pulley 146 mounted on the shaft 142 of the upper forwardmost roller 140 of the feed mechanism 42. Thus, the carriers 28 are driven at a constant speed in timed relation to the feed mechanisms 42 and, because of the connection of both the feed mechanisms and the cutters to the timing line drive shaft 162, the carriers 28 also travel in timed relation to the cutters.

Positioned within the loop defined by each carrier 28 and adjacent the rearward end of each carrier so as to influence the leading end portion of the webs 24 as they pass from the feed mechanisms 42 and, subsequently, the strips 26 after they are severed from the web 24, is the vacuum or suction box 47 (FIG. 8). Very generally, this vacuum box comprises a bottom plate 214 which, like the top plate 114 of the lower vacuum box 40, is provided with a plurality of holes or vents 216. The suction box 47 also includes a forward end wall 218, and a top wall 220 which is provided with an exhaust opening 222 connected to an upstanding duct 224 connected by means of a conduit 226 to the vacuum source 132. Side walls (not shown) are also provided. The rearward end of the box 47 is sealed by the lower rearward roll 208 which is closely engaged with the top wall 220, the bottom plate 214, and the side wall. This arrangement insures that the vacuum box will be capable of exerting its influence on the web 24 in close proximity to the roller 208 and, hence, in close proximity to the rearward end of the carrier 28.

It should be borne in mind that the strips 26 are conveyed at a constant speed by the carrier 28 to the web 22. Since it is desired that the centers of the strips be spaced a given distance from one another on the web 22, the centers of the strips are also desirably spaced from one another on the carrier 28 a distance greater than the length of the strips. In order to accomplish this spacing, the carriers 28 are caused to travel at a rate faster than that of the belts 138 of the feed mechanisms 42, causing the strips 26 to be carried away from the cutters 44 faster than they are delivered thereto. Consequently, after the leading edge portion of the web 24 is engaged by the carrier 28, and before this edge portion is severed from the web, a slippage occurs between the carrier 28 and the web because of the fact that the carrier is traveling at a rate faster than the web 24 is being fed, thereby creating a separation between the leading edge of the web 24 and the trailing edge of the strip 26 severed immediately before it, and giving rise to the desired spacing between the centers of the strips. This space is directly related to the relative speeds of the carrier 36 which supports the web 22 and the carriers 28 which support the strips 26. If the rate of travel of the carriers 28 and 36 is equal, the distance between the centers of the strips on the carriers 28 will be equal to the desired spacing between the centers of the deposited strips on the web 22 by any one carrier 28. This, of course, is the most convenient arrangement.

Also positioned within the loop of each carrier 28 immediately forward of the vacuum box 47 and in vertical alignment with the vacuum box 40 located beneath the carrier 36 and web 22, is the valved box 48 defining an inner chamber 228 which is alternately maintained at a vacuum pressure to retain the strips 26 on the carrier 28 as the carrier conveys them forwardly in the direction of the web 22, and at a positive pressure to urge the strips from the carrier 28 in the direction of the web 22 when the strips are in vertical alignment with that portion of the web 22 upon which they are desirably deposited.

Each valved box 48 comprises (FIGS. 8, 9 and 11) a flat bottom plate 230 which, like the top plate 114 of the lower suction box 40 and the bottom plate 214 of the upper suction boxes 47, is provided with a plurality of openings or vents 232 through which air may pass. Positioned above the bottom plate is a molded block 234 which encloses an overhanging central portion and depending end and side walls 236 and 238 respectively secured at their lower ends to the periphery of the bottom plate 230. A valve arrangement 240, hereinafter described in detail, is mounted in each of five cavities 242 provided in each block (FIG. 8) to control the air pressure within the chamber, and each cavity includes a partition 244 which divides it into a pair of compartments 246a and 246b. An intermediate plate 248 provided with a pair of parallel longitudinally extending passageways 250a and 250b which communicate with the valve cavities 242 overlies each block and a top wall 252 overlies each intermediate plate. A pair of fittings 254 and 256 are secured to the top wall and are connected to a vacuum conduit 258 and an air conduit 260, respectively. These conduits are in communication with each of the valve arrangements 240 through openings in the top wall at the fittings and thence through the passageways 250a and 250b in the intermediate plate 248 to the cavities 242 in which the valve arrangements are located.

Each of the five valve arrangements 240 of each of the valved boxes 48 comprises a hollow tubular sleeve 262 supported within a channel or hole extending through the block normal to the end walls thereof and in communication with the compartments 246a, 246b above it and with the chamber 228 of the valved box below it. One end of each channel is closed by a plate 264 extending across one end wall and provided with four plugs 266 which fit into the respective channels; the opposite end is closed by a similar plate 268 and plug 270, the plate 268, however, being formed to provide upper and lower bifurcated brackets 272 and 274 respectively defining a portion of an actuating mechanism 276 hereinafter described. Seals 278 are provided at each end of the sleeve 262 to cooperate with the plugs 266 and 270 in preventing the passage of air either inwardly or outwardly of the channel at its ends.

The sleeve 262 includes a plurality of pairs of vertically aligned openings extending through it from its upper to its lower surface. A first pair 280 located adjacent that end of the sleeve nearest the plate 268 includes an upper opening in direct communication with the compartment 246a, with the passageway 250a and with the vacuum conduit 258 through the fitting 254. The lower opening of the pair 280 also communicates with the compartment 246a and passageway 240a through the sleeve itself and through a cavity 282 located beneath the sleeve but in communication with the compartment 246a. A second pair or set of openings 284 is located adjacent the opposite end of the sleeve and includes an upper opening in direct communication with the compartment 246b, the passageway 250b and the air pressure conduit 260 through the fitting 256. The lower opening of the set 284 is in communication with the compartment 246b and passageway 250b through the sleeve and through a cavity 286 located beneath the sleeve but in communication with the compartment 246b. Three intermediate pairs of openings 288 are located generally centrally of the sleeve. The lower openings of each intermediate set is in direct communication with the chamber 228 of the valved box; the upper openings are in communication with a cavity 290 provided in the lower surface of the partition 244, which cavity is in communication with the chamber 228.

Thus, it will be seen that air passes from the chamber 228 into the sleeve 262 through the four intermediate openings 288, out of the sleeve through the openings of the first set 280, and through the vacuum conduit 258; air also passes through the air conduit 260 into the sleeve 262 through the second set of openings 284 and then into the chamber 228. The direction of movement of air is dependent upon the position of a valve spool 292 within the sleeve 262, as hereinafter described.

The valve spool 292 is slidably carried within the sleeve 262 and is capable of blocking or obstructing the first or second sets of openings depending upon its position within the sleeve. The spool is in the form of a bar having a central portion 294 of reduced diameter flanked on opposite sides by heads 296 and 298 of somewhat greater diameter approximating the inner diameter of the sleeve. A rod 300 of narrow diameter projects outwardly from the head 296 and extends through the plug 270 and plate 268 for connection to the actuating mechanism 276 by means of which the spool is reciprocated within the sleeve. The opposite head 298 of the spool has secured to it a coil spring 302, the outer end of which passes through a hole in the plug 266 and rests in a cavity 304 in the plate 264, thus biasing the spool in a direction urging the rod 300 outwardly of the channel.

The heads 296 and 298 of the spool 292 are generally equal in length to the distance between the outer edges of the first and second sets of openings 280 and 284 of the sleeve and the adjacent end of the sleeve. Consequently, when the spool is located at its leftmost position as viewed in FIGURE 11, as biased by the coil spring 302, this position being hereinafter referred to as the "first" position, the first set of openings 280 is unobstructed and air is free to pass from the chamber 228 through the first set of openings and into the vacuum conduit 258. In such position, however, the head 298 at the opposite end of the spool obstructs the openings 284 of the second set, thereby preventing air from entering the chamber 228 through the air conduit 260. Thus, the chamber 228 is maintained at a vacuum pressure. When the spool is urged by the actuating mechanism 276, hereinafter described, to its extreme position in the opposite direction, hereinafter referred to as the "second" position, against the force of the coil spring 302, the head 296 moves into a position wherein it blocks the first set of openings 280 but corresponding movement of the head 298 places the openings 284 of the second set in an unobstructed condition, thereby permitting air to flow from the air pressure conduit 260 into the chamber 228 while restricting the flow of air from the chamber 228 into the vacuum conduit 258. Air under pressure is thus forced through the vents 232 of the bottom plate of the valved box to eject the sheets from the carrier 28.

The valve arrangements 240 are actuated periodically by the actuating mechanism 276 so as to maintain the chamber 228 under vacuum condition as a strip 26 approaches the web 22 along the carrier 28, but to subsequently create a positive pressure in the chamber when the strip has reached a predetermined position above the web 22 traveling beneath it, thereby ejecting the strip toward the web. Very generally, the actuating mechanism comprises a cam follower 306 connected to the spool 292, and a cam wheel 308 in engagement with the follower and capable of effecting movement of the follower toward and away from the valved box 48 as the cam wheel rotates.

More specifically, support for the cam follower 306 is provided by the bifurcated brackets 272 and 274 secured to one end wall 236 of the valved box. Each lower bracket 274 projects outwardly from the end wall and is slotted to receive therein a link 310 pivotally mounted within the slot by a pin 312 and on which the cam follower 306 is mounted by means of a bracket 314. The upper bifurcated bracket 272 is also slotted to receive the upper end of the link 310 and serves to guide the upper end of the link incident to pivotal movement thereof. An arm 316 projects inwardly from the link 310 in the direction of the end wall of the box and has affixed thereto a ring 318 slidably carried on the rod 300 which extends outwardly from the spool 292. A nut 320 at the outer end of the rod limits sliding movement of the ring outwardly thereof, while a collar 322 fixed to the rod in spaced relation to the end thereof limits movement in the opposite direction. A coil spring 324 encircles the rod intermediate the slide and collar to absorb shock.

Thus, when the link 310 is rocketed in a clockwise direction (FIG. 11) about the pin 312, the spool 292 is moved inwardly against the force of the spring 302 to create a positive air pressure within the chamber 228. When the link pivots in a counter-clockwise direction, the spool is moved outwardly to create a vacuum condition within the chamber. Since the coil spring 302 urges the spool outwardly, i.e., toward the left as viewed in FIGURE 11, the normal condition of the valved box is that which produces a vacuum condition.

The cam wheel 308 of each actuating mechanism 276 includes a generally circular edge interrupted by an outstanding projection or nub 326. The circular edge and the edge of the nub 326 define a camming surface which is engaged by the cam follower 306 and on which the cam follower travels. The camming wheel 308 is so positioned relative to the cam follower 306 that when the follower engages the circular surface of the wheel, the spool is in its leftmost position, causing a vacuum to be maintained within the chamber. However, when the cam follower is in engagement with the outermost portion of the nub 326, the spool is in its rightmost position, thereby creating a positive pressure in the chamber. When the follower leaves the nub, it is returned to engagement with the circular surface of the cam wheel by the biasing action of the coil spring 302 urging the spool in the direction of the cam. The edge surface of the nub 326 constitutes only a small percentage of the total edge surface of the cam wheel 308. Hence, the valved box is maintained under positive air pressure for only a relatively brief interval.

The cam wheels of each of the five actuating mechanisms 376 of each valved box are mounted on a common shaft 328 (FIG. 2). The shafts 328 of the respective valved boxes are disposed parallel to one another and are rotated in unison. Each shaft has a pulley 330 secured to its forward end and these pulleys are linked by a suitable belt 332, thereby causing the shafts 328 of the two valved boxes to rotate in timed relation to each other. One of the shafts is further connected by means of a coupler 334 to one end of an extension shaft 336, the other end of which has affixed thereto a pulley 338. This pulley is connected by means of a belt 340 to a second pulley 342 (FIG. 4) mounted on a shaft 344 of a transmission box 346, a second shaft 348 of which has secured to it a pulley 350 connected by means of a belt 352 to a pulley 354 keyed to the timing line drive shaft 162. Thus, the valve actuating mechanism is driven in timed relation to the belts of the feed mechanism 42, to the cutters 44, and the carriers 28.

In the use of the apparatus in the manufacture of diapers, it is desirable to be able to control the spacing between the strips 26 on the web 22 to permit the manufacture of diapers of different lengths. In the illustrated apparatus, this may be accomplished by arranging the cam wheels 308 at different angular positions relative to each other on the shafts 328. Thus, instead of both carriers 28 depositing their sheets 26 simultaneously, one would precede the other. Of course, the fly-knives 166 of the cutters 44 would be angularly displaced relative to each other to the same degree, and the speed of the carrier 36 would be increased proportionately relative to the speeds of the carriers 28.

In the operation of the apparatus 20 in carrying out a preferred method of the invention, the essentially endless web 22 is continuously guided through the apparatus in the direction of its line of strength by the rollers 32 and 34 and passes immediately above the upper run 38 of the lower carrier 36 which is supported above the vacuum box 40. A substantial portion of the web 22 located within the apparatus is subjected to the constant suction pressure created by the vacuum box 40.

Simultaneously, a pair of webs 24, which are of somewhat narrower width, are directed into the apparatus in a direction perpendicular to the direction of movement of the web 22 and in a direction parallel to their line of strength. The webs 24 are guided by the rollers 134 and 136 into the feed mechanisms 42 which move them forwardly into engagement with the carrier 28, to which they are held by virtue of a suction pressure created by the upper vacuum box 47. The end portions of the webs 24 engaged by the carriers 28 are subsequently severed from the remainder of the webs by the cutters 44 to provide the strips 26 which are then transferred by the carriers at a speed greater than the speed of the feed mechanisms 42 and in a direction transverse to the direction of movement of the web 22, to a position beneath the valved boxes 48. As the strips pass initially under the valved boxes, the boxes are maintained under vacuum conditions. However, when the strip has reached a position in which it overlies the web 22, the vacuum pressure within the valved boxes is terminated, and simultaneously therewith a positive pressure is created in the valved boxes which ejects the strips from the carirers 28 and onto the web 22. This positioning is also influenced by the suction at the web caused by the vacuum box 40. When positioned on the web 22, the line of strength of the strips extends transversely to the direction of travel and to the line of strength of the web 22.

Thus a method and apparatus has been disclosed whereby strips of thin flexible material are deposited in predetermined spaced relationship upon a continuously moving web of similar material with the line of the strength of the strips arranged transversely of the line of strength of the web. While the method and apparatus of the invention have been described with respect to one specific embodiment of an apparatus embodying various of the features of the invention, it should be apparent that various modifications may be made in the apparatus shown and in the method practiced thereby without departing from the scope of the invention.

Various of the features of the invention are set forth in the following claims.

What is claimed is:

1. A method of transferring a light, flexible sheet from a first carrier to an air pervious, continuously moving second carrier, which method comprises the steps of placing the sheet on the first carrier at a preselected orientation relative to the direction of movement of the second carrier, maintaining the sheet on the first carrier by means of suction, conveying the sheet to said second carrier by means of said first carrier so as to place the sheet in close proximity to said second carrier, and transferring said sheet to said second carrier while maintaining the preselected orientation of said sheet by substantially simultaneously releasing the suction maintaining the sheet in contact with the first carrier, urging the sheet away from the first carrier by means of a positive air pressure, and drawing the sheet into engagement with the second carrier by means of suction.

2. A method of depositing a sheet of tissue paper having a greater strength in one direction than in the direction transverse thereto onto an air pervious continuously moving web in such a manner that the line of strength of the tissue is arranged transversely of the direction of movement of the web, which method comprises the steps of depositing the sheet on a carrier with its line of strength arranged in a predetermined direction relative to the carrier, maintaining the sheet on the carrier by means of suction, conveying the sheet to the web by means of the carrier so as to place the sheet in close proximity to the web with its line of strength transverse to the direction of movement of the web, and substantially simultaneously releasing the suction maintaining the sheet in contact with the carrier, urging the sheet away from the carrier by means of a positive air pressure, and drawing the sheet into engagement with the web by means of suction.

3. A method of depositing a sheet of tissue paper having a greater strength in one direction than in the direction transverse thereto onto an air pervious continuously moving web in such a manner that the line of strength of the tissue is arranged transversely of the direction of movement of the web, which method comprises the steps of depositing the sheet on a carrier at a point spaced laterally of the web with its line of strength arranged transverse to the direction of movement of the web, maintaining the sheet in contact with the carrier by suction, conveying the sheet toward the web by means of the carrier along a path transverse to the direction of movement of the web into close proximity to the web, and substantially simultaneously releasing the suction maintaining the sheet in contact with the carrier, urging the sheet away from the carrier by means of a positive air pressure, and drawing the sheet into engagement with the web by means of suction.

4. A method of providing a continuously moving air pervious web having strips of flexible sheet material arranged thereon which have a greater strength in a direction transverse to the direction of movement of the web than in a direction parallel to said direction of movement, which method comprises the steps of continuously moving the web along a given path, continuously moving a second web having strength in one direction greater than its strength in a direction transverse to the one direction along a path in a direction parallel to its line of strength, removing strips from the second web, depositing the strips on a carrier and maintaining them thereon by suction, moving the carrier so as to convey the strips into close proximity to the web with their line of strength parallel to their direction of movement and transverse to the direction of movement of the web, and substantially simultaneously releasing the suction maintaining the strips in contact with the carrier, urging the strips away from the carrier by means of a positive air pressure, and drawing the strips into engagement with the web by means of a suction when the strips arrive at a point on the carrier which is in close proximity to the web.

5. A method of providing strips of flexible sheet material on an air pervious web with the centers of certain of the strips spaced a predetermined distance from each other, which method comprises the steps of continuously moving the web along an essentially endless path at a given speed, disposing such strips on a carrier with their centers spaced from each other a given distance and maintaining the strips in such position on the carrier by suction, moving the carrier continuously at a speed having the same ratio to the given speed of the web as the given distance between the centers of the strips on the carrier has to the predetermined distance desired between the centers of the strips on the web, and substantially simultaneously releasing the suction maintaining each of the strips on the carrier, urging the strips away from the carrier by means of a positive air pressure, and drawing the strips into engagement with the web by means of a suction as each of the strips is brought by the carrier into close proximity to the web.

6. A method of providing strips of flexible sheet material on an air pervious web, with the centers of certain of the strips spaced a predetermined distance from each other, which method comprises the steps of continuously moving the web along a given path at a given speed, removing segments of predetermined length from a continuously moving second web of flexible sheet material traveling at a constant speed to form such strips, disposing such strips on a carrier with their centers spaced from each other a given distance and maintaining the strips in such position on the carrier by suction, moving the carrier continuously at a speed having the same ratio to the given speed of the web as the given distance between the centers of the strips on the carrier has to the predetermined distance desired between the centers of the strips on the web, and substantially simultaneously releasing the suction maintaining each of the strips on the carrier, urging the strips away from the carrier by means of a positive air pressure, and drawing the strips into engagement with the web by means of a suction as each of the strips is brought by the carrier into close proximity to the web.

7. A method of providing strips of flexible sheet material on an air pervious web with the centers of certain of the strips spaced a predetermined distance from each other, which method comprises the steps of continuously moving the web along a given path at a given speed, removing segments of predetermined length from a continuously moving second web of flexible sheet material traveling at a constant speed to form such strips, feeding such strips into engagement with a carrier and causing them ot adhere to the carrier by suction, moving the carrier continuously at a speed greater than the speed of the second web so as to cause a distance to be established between the centers of the strips on the carrier greater than the length of the strips, the speed of the carrier having the same ratio to the given speed of the web as the given distance between the centers of the strips on the carrier has to the predetermined distance desired between the centers of the strips on the web, conveying the strips on the carrier into close proximity to the web, and substantially simultaneously releasing the suction maintaining each of the strips on the carrier, urging the strips away from the carrier by means of a positive air pressure, and drawing the strips into engagement with the web by means of a suction as each of the strips is brought by the carrier into close proximity of the web.

8. An apparatus for depositing a strip of light flexible material on a continuously moving web of air pervious material, which apparatus comprises a first carrier formed of an air pervious material adapted to support the web, means effecting continuous traveling movement of said first carrier and the web along a path, means creating a suction pressure at the surface of said web supported on said first carrier, an elongated second carrier formed of an air pervious material for conveying a strip to the first carrier, means effecting continuous traveling movement of said second carrier along a second path passing in close proximity to said first path of said first carrier and adjacent that surface of said first carrier on which said web is supported, means creating a suction pressure at the adjacent surface of the second carrier effective to cause a strip to adhere thereto, and stationary means positioned in close proximity to the first carrier selectively operable in synchronization with the operation of said second carrier for periodically releasing the suction pressure causing a strip to adhere to the second carrier while substantially simultaneously creating a positive air pressure at the adjacent surface of the second carrier as it passes in close proximity to the first carrier so as to cause a strip disposed on said second carrier to be ejected therefrom onto said web.

9. An apparatus for depositing a strip of light flexible material on a continuously moving web of air pervious material, which apparatus comprises an elongated first carrier formed of an air pervious material adapted to support the web with a substantial portion thereof lying in a given plane, means effecting continuous traveling movement of said first carrier and the web along a path lying in said given plane, means creating a suction pressure at the outer surface of said web supported on said first carrier, an elongated second carrier formed of an air pervious material for conveying a strip to the first carrier, said second carrier including a portion disposed in a plane parallel to and closely adjacent said given plane, means effecting continuous traveling movement of said second carrier along a second path within said parallel plane, means creating a suction pressure at the surface of the second carrier adjacent the web effective to cause a strip to adhere thereto, and stationary means positioned in close proximity to the parallel plane of said second carrier selectively operable in synchronization with the operation of said second carrier for periodically releasing the suction pressure causing a strip to adhere to the second carrier while substantially simultaneously creating a positive air pressure at the adjacent surface of the second carrier as it passes in close proximity to the first carrier so as to cause a strip disposed on said second carrier to be ejected therefrom onto said web.

10. An apparatus for depositing a strip of tissue having a strength in one direction greater than its strength in a direction transverse to the one direction onto a continuously moving web with the line of strength of the strip arranged transverse to the direction of movement of the web, which apparatus comprises a first carrier formed of an air pervious material adapted to support the web, means for effecting continuous traveling movement of said first carrier and the web along a given path, means for creating a suction pressure at the surface of said web supported on said first carrier, an elongated second carrier formed of an air pervious material for conveying a strip to said first carrier, said second carrier being arranged with its longitudinal axis transverse to the path of movement of said first carrier, means effecting continuous traveling movement of said second carrier along a given path parallel to the longitudinal axis of said second carrier and passing in close proximity to said first carrier, means for depositing a strip on said second carirer with the line of strength of the strip arranged transversely of the path of movement of said second carrier, means creating a suction pressure at the surface of said second carrier effective to cause a strip to adhere thereto, and means selectively operable in synchronization with the operation of said second carrier for releasing the suction pressure causing a strip to adhere to the second carrier while substantially simultaneously creating a positive air pressure at the surface of said second carrier in close proximity to the receiver effective to cause the strip disposed on the said second carrier to be ejected therefrom onto the web.

11. An apparatus for depositing a strip of light flexible material on a continuously moving web of air pervious material, which apparatus comprises a first carrier formed of an air pervious material adapted to support the web, said first carrier being in the form of an endless loop having an upper and a lower generally horizontally disposed run, means effecting continuous traveling movement of said first carrier and the web along a path, means within the loop defined by said first carrier adjacent said upper run for creating a suction pressure at the surface of said web supported on said first carrier, an elongated second carrier formed of air pervious material for conveying a second strip to the receiver, said second carrier being in the form of an endless loop having an upper and a lower generally horizontally disposed run and being disposed with its lower run partially overlying and transverse to the upper run of said first carrier, means for effecting continuous traveling movement of said second carrier, means creating a suction pressure at the lower surface of the lower run of said second carrier effective to cause a strip to adhere thereto, and stationary means positioned within the loop of said carrier in close proximity to the lower run thereof and generally vertical alignment with the upper run of the receiver of the web selectively operable in synchronization with the operation of said second carrier for creating a suction pressure effective to cooperate with said latter-mentioned means to cause the strip to adhere to the said second carrier and for periodically releasing the suction pressure causing a strip to adhere to the second carrier while substantially simultaneously creating a positive air pressure at that surface of the second carrier which overlies the first carrier so as to cause the strip disposed on said surface of said carrier to be ejected therefrom onto said web.

12. An apparatus in accordance with claim 11 wherein said means creating a suction pressure at the lower surface of the lower run of said second carrier and said means for periodically creating a positive air pressure at that surface of second carrier which overlies said first carrier comprises a vacuum box positioned within the loop of said second carrier in communication with the lower run thereof and extending from one end of said lower run of said second carrier to a first point spaced from said one end of said lower run in the direction of travel of said lower run, said vacuum box being continuously maintained under vacuum pressure so as to retain a strip on that portion of said lower run extending between said one end and said first point, and a valved box also positioned within the loop of said second carrier and extending from said first point in the direction of travel of the lower run of said second carrier toward the opposite end of said lower run, said valved box being alternately maintained at a vacuum pressure to retain a strip on that portion of said lower run extending from said first point to a second point overlying said first carrier, and at a positive pressure to cause the strip to be ejected from said lower run onto said first carrier when its center reaches said second point.

13. An apparatus for depositing strips of sheet material onto a continuously moving web, which apparatus comprises means for continuously conveying a first web through the apparatus, means continuously feeding a second web into the apparatus at a given linear speed, means for severing segments from the second web to form strips of predetermined length, an elongated carrier formed of an air pervious material positioned adjacent said severing means for receiving the strips as they are formed, means creating a suction pressure at the surface of said carrier effective to cause the strips to adhere thereto, means for effecting continuous traveling movement of said carrier at a speed greater than the given linear speed at which the second web is fed so as to create a distance between the centers of the strips on said carrier greater than the length of the strips, means causing said carrier to convey the strips into close proximity to the first web, and selectively operable means for releasing the suction pressure causing a strip to adhere to the carrier while substantially simultaneously creating a positive air pressure at the surface of said carrier in close proximity to the receiver effective to cause the strip disposed on the said carrier to be ejected therefrom onto the receiver.

14. An apparatus for depositing strips of sheet material onto a continuously moving web, which apparatus comprises means for causing the web to travel through the apparatus at a controlled speed, means for forming strips, an elongated carrier formed of an air pervious material for receiving the strips and conveying them into close proximity to the web, means creating a suction pressure at the surface of the carrier effective to cause a strip to adhere thereto, selectively operable means for releasing the suction pressure causing a strip to adhere to the carrier while substantially simultaneously creating a positive air pressure at the surface of said carrier in close proximity to the web effective to cause the strip disposed on the said carrier to be ejected therefrom onto the web, and means for selectively controlling the rate at which the strips are fed to the web by the carrier relative to the speed of the web so as to permit selective variation in the distance between the centers of the strips deposited on the web.

References Cited
UNITED STATES PATENTS

| | | | |
|---|---|---|---|
| 2,299,690 | 10/1942 | Giese | 271—12 |
| 3,123,354 | 3/1964 | Ungerer | 271—74 |
| 3,269,235 | 8/1966 | Crouch et al. | 83—152 |
| 3,291,282 | 12/1966 | Pedagno | 271—74 X |

ALLEN N. KNOWLES, *Primary Examiner.*